Sept. 5, 1950 S. J. CITSO 2,521,043

TELEPHONE HOLDER

Filed March 20, 1946 2 Sheets-Sheet 1

Inventor

STEVEN J. CITSO by [signature] his [attorneys]

Sept. 5, 1950 S. J. CITSO 2,521,043

TELEPHONE HOLDER

Filed March 20, 1946 2 Sheets-Sheet 2

Inventor

Steven J. Citso by The Firm of Charles W. Hills Attys.

Patented Sept. 5, 1950

2,521,043

UNITED STATES PATENT OFFICE 2,521,043

TELEPHONE HOLDER

Steven J. Citso, Chicago, Ill.

Application March 20, 1946, Serial No. 655,843

1 Claim. (Cl. 179—147)

This invention relates to improvements in a telephone holder, highly desirable for use in connection with the holding of or supporting of a telephone hand set, although the invention may have other uses and purposes as will be apparent to one skilled in the art.

In the past, many and various devices have been developed for holding telephone receivers or telephone hand sets in such a manner that a conversation may be carried on and both hands of a user remain free during such conversation. Formerly known devices of this character were, in most instances, highly objectionable in that they required a change in construction or alteration in the telephone equipment furnished by the telephone company to a customer. Any change in the telephone instrument itself by a customer is frowned upon by the supplier of the telephone service, and in many cases may lead to a forced discontinuation of the service. In other instances, telephone holding devices of the character heretofore known were objectionable in that they took up too much space, embodied too many moving parts, some of which would likely become out of order and mayhap permit the telephone circuits to remain energized unintentionally. Other unsatisfactory features of such formerly known devices resided in clumsiness in structure, expense in manufacture, installation, and consumer cost, and one of the main unsatisfactory features was the lack of universal adjustment so that the desired degree of comfort on the part of the user was not obtainable.

With the foregoing in mind, it is an important object of the instant invention to provide a telephone holding arrangement highly desirable for the holding or supporting of a hand set and which is equipped with a universal joint between the supporting arm and hand set gripping element so that any desired angular positioning of the hand set may readily be obtained.

Another object of the instant invention resides in the provision of a telephone holding arrangement in which a receiver or hand set may be held at an exactly adjusted position for an indefinite length of time so that the user need never change the adjustment or bother with it after once the accurate adjustment has been determined.

It is also a feature of this invention to provide a telephone holding arrangement which will support a receiver or hand set in a desired position of adjustment, and the hands of the user never need contact such receiver or hand set when he desires to use the telephone, but energization in the telephone circuits may be established by the simple manipulation of a lever or button at the start of the conversation and at the termination of the conversation, the hands of the user being otherwise absolutely free during the conversation.

Still another object of the instant invention resides in the provision of a telephone holding arrangement capable of supporting a hand set in a desired position of adjustment and in which the switch mechanism of the cradle is readily manipulated by a lever at the start and finish of a conversation without the hands contacting the telephone instrument, such lever being in a very convenient location.

It is also an object of this invention to provide a telephone holding arrangement in which a hand set remains always in a desired position of adjustment, and the energization of the telephone circuits is controlled by a readily accessible manual switch.

Still a further feature of the instant invention resides in the provision of a telephone holding arrangement that is extremely simple in construction, highly durable and economical to manufacture and use, the arrangement taking up little space when associated with a telephone.

While some of the more salient features, characteristics and advantages of the instant invention have been above pointed out, others will become apparent from the following disclosures, taken in conjunction with the accompanying drawings, in which.

As shown on the drawings.

Figure 1:
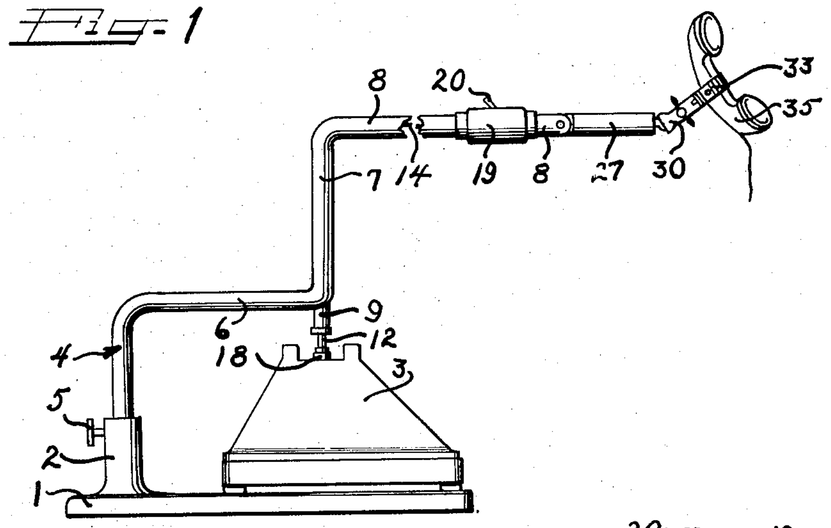
Figure 1 is a side elevational view of a telephone holding apparatus embodying principles of the instant invention.
Figures 2, 3:
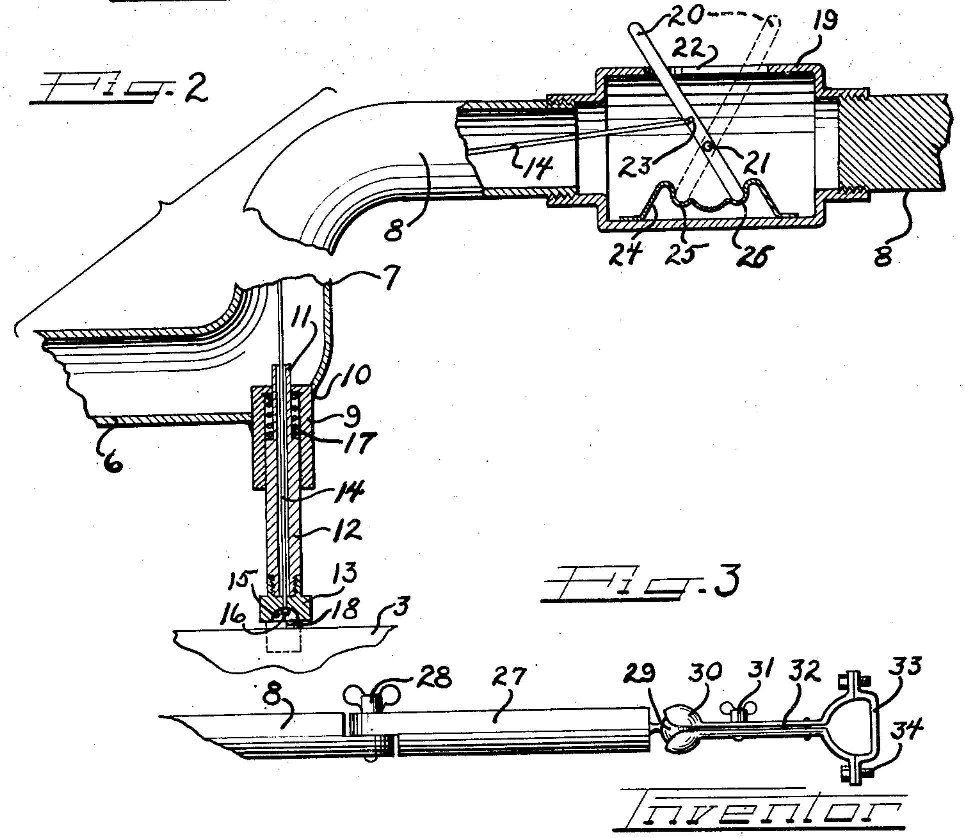
Figure 2 is an enlarged fragmentary part sectional, part elevational view of the central portion of Figure 1.
Figure 3 is an enlarged fragmentary elevational view of the right-hand portion of Figure 1, with the hand set removed.

In that embodiment of the instant invention illustrated in Figures 1, 2 and 3, there is shown a telephone holding apparatus including a base 1 having an upright socket 2 adjacent an end thereof. This base 1 is of sufficient size to accommodate a cradle 3 of a hand set telephone upon the base in front of the socket 2. Seated in the socket 2 is a supporting arm 4 which may be rotated relatively to the socket to provide an angular adjustment and which may be telescopically moved with respect to the socket to provide a height adjustment, a suitable set screw 5 locking the supporting arm in the desired position of adjustment. This supporting arm is preferably shaped to provide a horizontally extending portion 6 that reaches forwardly over the top of the cradle 3, an upright portion 7 and another horizontally disposed portion 8 which joins with the hand set holding means. Preferably, the entire supporting arm 4 is in the form of a pipe. This provides two advantages in that circuit control means to be later described may be contained within the arm, and the entire arm is much lighter than if it were solid.

At the elbow between the parts 6 and 7 of the arm 4, an opening is made in the arm and a cylinder 9 is welded or equivalently secured to the arm as indicated at 10. This cylinder has its closed end uppermost and this closed end is apertured to accommodate a projecting portion 11 of a hollow plunger 12 which is reciprocable within the cylinder 9. At the lower end of the plunger 12 a cap 13 is threadedly engaged with the plunger, and this cap is apertured to accommodate a wire or other tension element 14 extending through both the plunger and cap. The cap may be provided with a recess 15 in the bottom face thereof, to receive a knot 16 or equivalent anchoring element on the wire 14. A coiled spring 17 disposed between the wide portion of the plunger 12 and the end of the cylinder 9 normally urges the plunger downward.

When in its downward position, the cap 13 rests on top of one of the circuit controlling buttons 18 of the telephone cradle 3, holding that button 18 downwardly in the same manner as would be accomplished were the telephone hand set placed upon the cradle. Thus, the telephone circuit is maintained open when the telephone is not in use.

The wire or tension element 14 extends upwardly through portions 7 and 8 of the arm and into a housing 19 forming a portion of the part 8 of the supporting arm 4. This housing is preferably of larger diameter than the arm. A lever 20 is pivotally mounted as at 21 inside the housing, part of the lever projecting through a slot 22 in the top of the housing. The wire 14 is attached to the lever as at 23 above the pivot point 21. A spring element 24 mounted in the lower portion of the housing 19 is provided with integrally formed sockets 25 and 26 for reception of the lower end of the lever. Thus, when the lever is in the full line position seen in Figure 2 with its lower end engaged in the socket 26 of the spring, the plunger 12 and its cap or head 13 is in lowered position pressing down upon the circuit controlling button 18 of the cradle 3 so that the telephone circuits are open. When it is desired to use the telephone, it is a simple expedient to flick the lever 20 to the dotted line position of Figure 2 with the lower end of the lever then resting in the socket 25, thus pulling up the plunger 12 by means of the wire 14, permitting the button 18 to rise and close the telephone circuits.

With reference now more particularly to Figure 3, it will be noted that the portion of the part 8 of the arm beyond the housing 19 is preferably solid with its outer end portion cut half away to accommodate a complementally formed end portion on a rod 27. These confronting end portions may be held in any desired position of angular adjustment by means of a pivot pin and thumb nut arrangement 28.

The outer end of the rod 27 preferably terminates in a ball or equivalent formation 29. Associated with this ball is a split socket member 30 also having a thumb nut arrangement 31 by means of which the split socket may be tightened down on the ball to anchor the respective parts in a desired position of adjustment. It will, of course, be understood that the ball and socket arrangement 29—30 provides substantially a universal joint movable in any direction. An arm 32 integral with the split socket 30 carries on its outer end a stirrup arrangement 33 held in position by set screws 34 or the equivalent, which stirrup arrangement may clamp around the center portion of the telephone hand set 35, as illustrated in Figure 1.

The instant invention, as above described, is extremely simple in operation. The device is first placed in a convenient location, and then the telephone cradle may be set upon the base 1. The supporting arm 4 is then adjusted by means of the set screw 5 at the right height so that the plunger 12 will hold down the control button 18 of the cradle 3 and maintain the telephone circuits open. Then, the rod 27 may be adjusted at the desired angular position with respect to the portion 8 of the supporting arm 4, the universal joint arrangement 29—30 may be adjusted to the desired angle, and the hand set 35 clamped in position. All of these adjustments need not necessarily be made, but whatever adjustments are desired can be made with or without the hand set in position, so that the hand set will thereafter be held indefinitely at a desired angle. It is then simply necessary for the user to merely move his head into position adjacent the hand set whenever he desires to use the telephone, and by simply flicking the lever 20 with a finger the telephone is ready for use. Both hands of the user remain free during a conversation to take notes, adjust papers, or perform any other desired operation, and at the termination of the conversation, it is a simple expedient to flick the lever 20 in the opposite direction. The hand set 35 always remains in the same position so that upon the next use of the telephone, the operation may be completed with no thought given to the position of the hand set or no necessity of ever grasping it. It is simply necessary for the user to place his head adjacent the hand set. The entire device will take up little room, and may be disposed in any convenient location adjacent the user.

Figure 4:
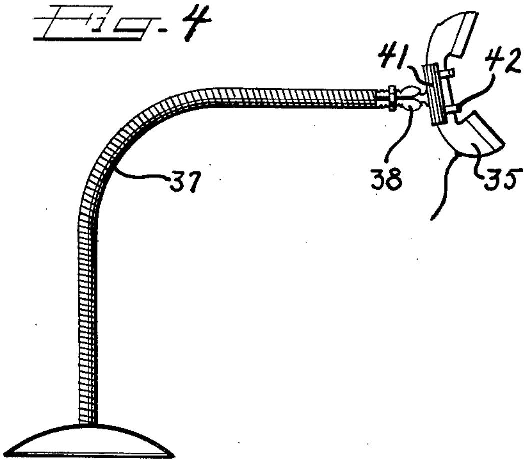
Figure 4 is a side elevational view of a telephone holding appliance embodying the principles of this invention but illustrating a different form of construction.
Figure 5:
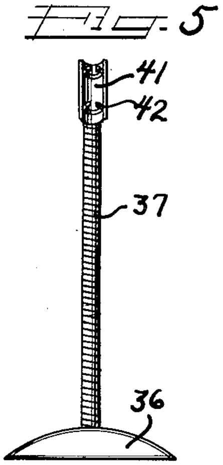
Figure 5 is an elevational view taken from the right-hand side of Figure 4, with the hand set removed.
Figure 6:
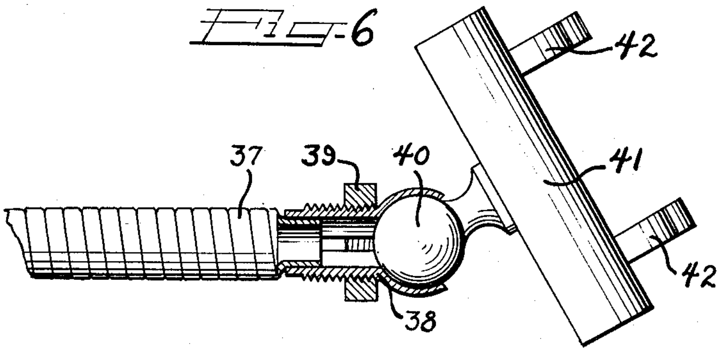
Figure 6 is an enlarged fragmentary sectional side elevational view of the right-hand portion of the structure seen in Figure 4, with the hand set removed.

In Figures 4, 5 and 6, I have illustrated a simple form of the instant invention which incorporates a quickly adjustable supporting arrangement highly desirable for home use where anyone of several different people commonly use the telephone. With this arrangement, the hand set 35 remains upon the cradle of the telephone when the telephone is not in use. The arrangement includes a weighted base 36 having a flexible supporting arm 37 associated therewith.

With reference more particularly to Figure 6 it will be noted that the end of the arm 37 is provided with a split socket assembly 38 that may be tightened by means of a nut 39 around a ball 40 carried by a hand set holding bracket 41. The bracket 41 is provided with one or more spring clips 42, two being shown, into which the intermediate portion of the hand set 35 may be pressed or snapped. Obviously, the ball and split socket arrangement may be tightened to hold the bracket 41 at a fixed angle to the end of the arm 37 or tightened a little less securely so that the bracket may still support the hand set 35 but be movable relatively to the arm 37 by the user.

With this arrangement, it is a simple expedient when it is desired to use the telephone, to pick up the hand set, snap it into engagement with the spring clips 42, and then by pushing against the flexible arm 37 adjust the hand set to the desired angle for the particular user. When the conversation is completed, the hand set is removed from the clips 42 and placed upon the telephone cradle. The apparatus may be just as expeditiously adjusted for the next user of the telephone.

Figure 7:
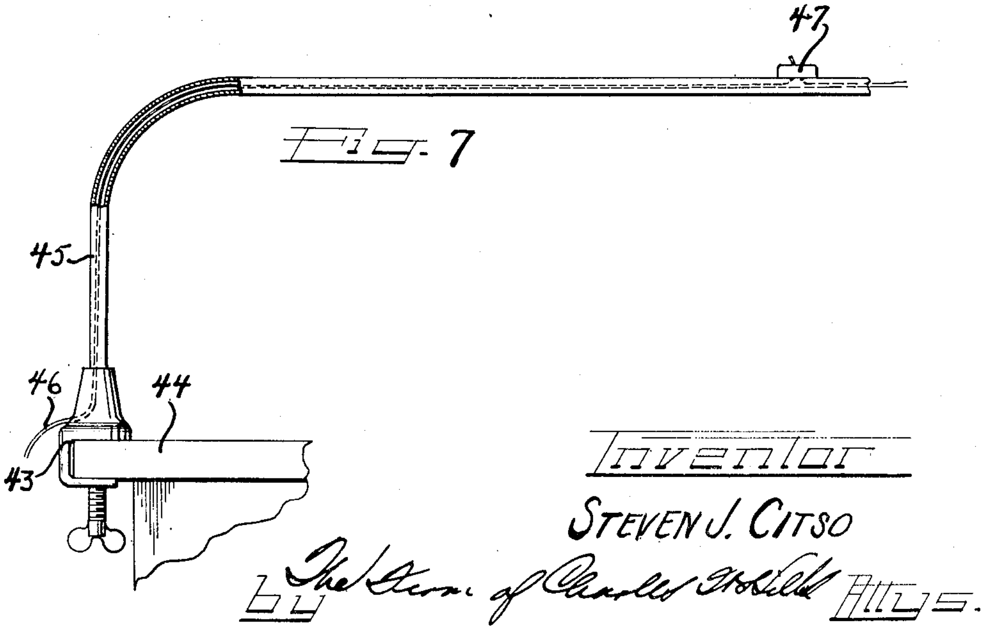
Figure 7 is a fragmentary, part sectional, part elevational view of a telephone holding apparatus embodying principles of this invention showing a still different form of construction.

In Figure 7, I have shown a still different form of the invention, this form being of the same general character as that illustrated in Figures 1, 2 and 3. In this instance, a C-clamp base 43 is provided by means of which the entire supporting apparatus may be anchored to the edge of a desk 44 or other article of furniture. A hollow supporting arm 45 is connected with the socket portion of the C-clamp. Through this supporting arm, a cable 46 carrying the wires leading to the hand set may extend. As shown by dotted lines in Figure 7, one or more of the wires of the cable may be open, and controlled by a switch 47 mounted on the arm 45 so that the telephone circuits are actually opened and closed by means of that switch. Beyond the switch 47, the structure may be the same as above described in connection with Figures 1, 2 and 3 on the hand set side of the housing 19.

It will be noted that with this arrangement no thought need be given to the telephone cradle, and in fact a cradle need not be used. It is simply necessary to have a bell ringing arrangement that may be mounted upon the wall of the room, with the cable therefrom passing through the supporting arm 45 to the hand set which will be carried indefinitely in a position of adjustment as in the showing of Figure 1. The actual telephone circuits are opened and closed by manipulating the switch 47 in the same manner that the aforesaid lever 20 was manipulated.

From the foregoing, it is apparent that I have provided telephone holding apparatus that is simple in construction, highly efficient in operation, economical both to manufacture and use, and very durable. With the instant invention, the telephone hand set may be held in an exact degree of adjustment for an indefinite length of time and the telephone circuits controlled by the simple flicking of a lever or switch so that both hands of the operator are free in regard to the hand set at all times, with the exception of the single embodiment of the invention illustrated in Figures 4, 5 and 6. In all embodiments of the invention, however, there is a universal joint between the supporting arm of the apparatus and the hand set of the telephone so that the exact degree of adjustment may be obtained at any time.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a telephone holding apparatus, a main base of sufficient size to accommodate thereon a telephone base, a hollow supporting arm on said main base and having an offset part to extend over a telephone base on said main base, a resiliently biased plunger set into said arm in said offset part and normally extending downwardly to hold the control button of a telephone base depressed, a tension element connected to said plunger and extending through said arm, a lever projecting without said arm to which said tension member is connected and operable to retract said plunger, and an adjustable holder for a hand set on said arm.

STEVEN J. CITSO.

REFERENCES CITED

The following references are of record in the file of this patent:

UNITED STATES PATENTS

| Number | Name | Date |
|---|---|---|
| 1,047,293 | Reynolds | Dec. 17, 1912 |
| 1,959,572 | Craig | May 22, 1934 |
| 2,310,032 | Mathieson | Feb. 2, 1943 |

FOREIGN PATENTS

| Number | Country | Date |
|---|---|---|
| 100,075 | Switzerland | July 2, 1923 |
| 221,123 | Switzerland | Sept. 16, 1942 |